US012617932B2

(12) United States Patent
Lu et al.

(10) Patent No.: US 12,617,932 B2
(45) Date of Patent: May 5, 2026

(54) MILLIMETER-WAVE RADAR HOUSING MATERIAL CAPABLE OF BEING LASER WELDED, AND PREPARATION METHOD THEREFOR

(71) Applicants: NANJING JULONG SCIENCE & TECHNOLOGY CO., LTD., Nanjing (CN); NANJING DONGJU CARBON FIBER COMPOSITE RESEARCH INSTITUTE CO., LTD., Nanjing (CN)

(72) Inventors: Jun Lu, Nanjing (CN); Xiaojie Shen, Nanjing (CN); Lanjun Li, Nanjing (CN); Yong Zhao, Nanjing (CN); Yutong Shao, Nanjing (CN); Bin Dong, Nanjing (CN); Shuyang Liu, Nanjing (CN); Tichao Lu, Nanjing (CN)

(73) Assignees: NANJING JULONG SCIENCE & TECHNOLOGY CO., LTD., Nanjing (CN); NANJING DONGJU CARBON FIBER COMPOSITE RESEARCH INSTITUTE CO., LTD., Nanjing (CN)

( * ) Notice: Subject to any disclaimer, the term of this patent is extended or adjusted under 35 U.S.C. 154(b) by 826 days.

(21) Appl. No.: 17/907,829

(22) PCT Filed: Jun. 25, 2021

(86) PCT No.: PCT/CN2021/102326

§ 371 (c)(1),
(2) Date: Aug. 29, 2022

(87) PCT Pub. No.: WO2022/100102

PCT Pub. Date: May 19, 2022

(65) Prior Publication Data

US 2023/0132076 A1     Apr. 27, 2023

(30) Foreign Application Priority Data

Nov. 10, 2020     (CN) .......................... 202011246478.4

(51) Int. Cl.
| | |
|---|---|
| *C08K 7/14* | (2006.01) |
| *C08L 23/12* | (2006.01) |
| *G01S 7/02* | (2006.01) |

(52) U.S. Cl.
CPC ................ *C08K 7/14* (2013.01); *C08L 23/12* (2013.01); *G01S 7/027* (2021.05); *C08L 2201/08* (2013.01); *C08L 2203/20* (2013.01)

(58) Field of Classification Search
CPC . C08K 7/14; G01S 7/027; C08L 23/12; C08L 2201/08; C08L 2203/20
USPC ........................................................ 525/240
See application file for complete search history.

(56) References Cited

U.S. PATENT DOCUMENTS

| | | | | |
|---|---|---|---|---|
| 2020/0001546 A1* | 1/2020 | Furukawa | ............. | B29C 66/929 |
| 2022/0145046 A1* | 5/2022 | Cremer | .................... | C08K 3/04 |

FOREIGN PATENT DOCUMENTS

| | | | | | |
|---|---|---|---|---|---|
| CN | 101473246 A | | 7/2009 | | |
| CN | 102174209 A | * | 9/2011 | | |
| CN | 103131081 A | | 6/2013 | | |
| CN | 105860265 A | * | 8/2016 | ............. | C08L 23/12 |
| CN | 106630683 A | * | 5/2017 | ............. | C03C 25/40 |
| CN | 109651696 A | * | 4/2019 | ............. | C08L 23/10 |
| CN | 110527188 A | | 12/2019 | | |
| CN | 111057310 A | | 4/2020 | | |
| CN | 112358684 A | | 2/2021 | | |
| WO | WO2014192470 A1 | | 12/2014 | | |
| WO | WO-2018168554 A1 | * | 9/2018 | ............. | B29C 65/02 |
| WO | WO-2020173766 A1 | * | 9/2020 | ............. | C03C 3/087 |

OTHER PUBLICATIONS

Zheng et al., CN 102174209 A machine translation in English, Sep. 7, 2011. (Year: 2011).*
Zhang et al., CN 106630683 A machine translation in English, May 10, 2017. (Year: 2017).*
Wang et al., CN 105860265 A machine translation in English, Aug. 17, 2016. (Year: 2016).*
Wang et al., CN 109651696 A machine translation in English, Apr. 19, 2019. (Year: 2019).*

* cited by examiner

*Primary Examiner* — David T Karst
(74) *Attorney, Agent, or Firm* — Bret E. Field; Bozicevic, Field & Francis LLP

(57) ABSTRACT

A millimeter-wave radar housing material capable of being laser welded, and a preparation method therefor, which belong to the technical field of millimeter-wave radar housing manufacturing. The millimeter-wave radar housing material specifically comprises the following components in parts by weight: 50-90 parts of polypropylene, 10-50 parts of glass fiber, 0.2-0.8 part of a nucleating agent, 0.5-1 part of a compatibilizer, 0.1-0.5 part of a black colorant, 0.1-0.5 part of an antioxidant, and 0.1-0.8 part of a light stabilizer. The radar housing material disclosed by the present invention has the advantages of low dielectricity, being lightweight, high strength and high heat resistance, can transmit a near-infrared light beam, and has laser weldability.

9 Claims, No Drawings

MILLIMETER-WAVE RADAR HOUSING MATERIAL CAPABLE OF BEING LASER WELDED, AND PREPARATION METHOD THEREFOR

FIELD OF THE PRESENT DISCLOSURE

The present invention relates to the field of millimeter-wave radar housing materials and, in particular, to a 77 GHz millimeter-wave radar housing material capable of being laser welded.

BACKGROUND OF THE PRESENT DISCLOSURE

Millimeter-wave radar is a radar that is operated within the millimeter-wave band, usually in the 30-300 GHz frequency band. The automotive millimeter-wave radars mainly include 24 GHz narrowband radar (24.00-24.25 GHz), 24 GHz ultra-wideband radar (24.25-24.65 GHz), 77 GHz radar (76-77 GHz), and 79 GHz radar (77-81 GHz). Compared with the 24 GHz radar, the 77 GHz radar is smaller in size and has better detection accuracy, and the requirements for radar housing materials are in a tendency for lower dielectric constant, lower dielectric loss, and lightweight.

The radar housing material must meet the requirements of dielectric properties, mechanical properties, process properties, and weight. The dielectric properties of materials include dielectric constant and dielectric loss. If the dielectric constant is large, the reflectivity of the electromagnetic wave at the interface between the air and the radar housing will be large, which will increase the mirror lobe level and reduce the transmission efficiency. If the dielectric loss is large, energy loss, due to conversion of the electromagnetic wave energy into heat when penetrating the radar housing, is higher. Therefore, it requires both the dielectric constant and dielectric loss of the radar housing material to be as low as possible to achieve the purpose of maximum transmission and minimum reflection. The low dielectric constant material imparts a broadband response to the radar housing, allowing larger housing thickness tolerances, thereby reducing manufacturing costs.

Generally, the millimeter-wave radar housing material adopts fiber-reinforced thermoplastic composite materials, such as polyphenylene sulfide (PPS), polybutyene terephthalate (PBT), and polyimide (PI). A PPS capable of balancing various properties has been developed by Polyplastics, Japan. A polyimide (PI) material suitable for millimeter-wave radar has been developed by Toray, Japan. A radar wave penetrable material based on a reinforced PBT modified by glass fiber has been developed by SABIC. These materials have the advantages of high strength, high-temperature resistance, and chemical resistance, but the problems of high density and high cost limit the broad application of these materials in the field of millimeter-wave radar. In addition, PBT and PI materials contain polar groups, and their dielectric constants are generally higher than 3. After glass fiber reinforcement, the dielectric constant is higher than 3.5, which limits the use in millimeter-wave radar.

Glass fiber reinforced polypropylene has a relatively low dielectric constant and low cost. In recent years, glass fiber reinforced polypropylene is becoming more and more popular for radar housing material. Patent No. CN110527188A discloses a high-wave-transmissivity polypropylene composition and a preparation method thereof. In the range of 22

GHz-80 GHz millimeter-wave, the frequency loss of the material is less than 3%. The dielectric constant is about 2.2 under the 1 MHz test condition. The material has a relatively high wave-penetration performance and a relatively low dielectric constant. However, its low strength and poor heat resistance make it inappropriate for radar housing applications.

Generally, the radar housing is fixed on the mounting surface by means of screws. However, this installation has many disadvantages, such as easy loosening, detachment, and poor sealing performance, and cannot protect the radar device well. Compared with screw connection, laser welding plastic has the advantages of reliable connection, good sealing, easy processing, and water impermeability, which can ensure millimeter-wave transmission performance.

The principle of plastic laser welding is that two parts of plastic to be welded are pressed together by pressure, then a near-infrared laser beam passes through a laser-transmitting materials at an upper layer, and is absorbed by the laser-absorbing materials at a lower layer to melt the plastic contact surface, thereby bonding the thermoplastic sheet, film or molded parts together. As a modern welding technology, laser welding has many advantages, such as large melting depth, high speed, small deformation, low requirements for the welding environment, high power density, not affected by the magnetic field, without limitation to conductive materials, no vacuum operation conditions and no X-ray generated during the welding process. It is very suitable for the welding of miniature parts and poorly accessible parts and is widely used in the field of high precision manufacturing.

In view of the structural characteristics of polyolefin, only laser-absorbing carbon black is an ideal black pigment for polyolefin, and laser transmission welding thereof cannot be achieved. The near-infrared transmission rate of the upper layer material is one of the indicators to evaluate the welding quality. Therefore, how to make the black millimeter-wave radar housing meet the requirements of low dielectric constant, high strength, high heat resistance, and lightweighting while improving the near-infrared transmittance of the housing, and how to use laser welding to join, which is a key technology to expand the application of materials in the field of millimeter-wave radar housings, there is still no report from the relevant technology or patent.

SUMMARY OF THE PRESENT DISCLOSURE

In order to solve the above technical problem, the present invention provides a radar housing material that has the advantages of low dielectricity, lightweighting, high strength, and high heat resistance, can transmit a near-infrared laser beam, and has laser weldability.

In order to solve the above technical problem, the technical solutions of present invention are as follows:

A millimeter-wave radar housing material capable of being laser welded comprising the following components in parts by weight:

| | |
|---|---|
| polypropylene | 50-90 |
| glass fiber | 10-50 |
| nucleating agent | 0.2-0.8 |
| compatibilizer | 0.5-1 |
| organic black colorant | 0.1-0.5 |
| antioxidant | 0.1-0.5 |
| light stabilizer | 0.1-0.8 |

In a further aspect, the polypropylene is one or more of a high flow homo-polypropylene or a co-polypropylene.

In a further aspect, the glass fiber is one or more of an alkali-free glass fiber yarn treated with a silane-type impregnating agent.

In a further aspect, the nucleating agent is a nano-scale acicular attapulgite having an aspect ratio of 30-50 and a particle size of 5-8 microns.

In a further aspect, the compatibilizer is a graft of maleic anhydride and polyolefin, and the grafting rate of maleic anhydride is 1.0%-2.5%.

In a further aspect, the black colorant is compounded by solvent red, solvent blue, solvent green, and solvent yellow in a weight ratio of (6-8):(3-5):(1-3):(0.5-1). Preferably, the solvent red is E2G; the solvent blue is RR; the solvent green is 5B; the solvent yellow is Yellow G.

In a further aspect, the antioxidant is one or more of antioxidants such as hindered phenols, amines, phosphite esters, and thioester etc. Preferably, the antioxidant is compounded by 1010 and 168 in a weight ratio of 1:1 or 1:2.

In a further aspect, the light stabilizer is one or more of light stabilizers such as hindered amines, benzotriazoles, and benzophenones etc.

A preparation method for a millimeter-wave radar housing material capable of being laser welded, comprising the steps of:

adding polypropylene, a compatibilizer, an antioxidant, a black colorant, a light stabilizer, and a nucleating agent into a mixer in a certain proportion, thoroughly and homogeneously mixing the same; adding the resulting mixture into a twin-screw extruder; extruding the resulting resin melt into an impregnation die connected to a head of the twin-screw extruder; then passing the continuous glass fiber through the impregnation die, sufficiently impregnating the continuous glass fiber with the melt; finally cooling, drawing and pelletizing the resultant material to obtain a millimeter-wave radar housing material capable of being laser welded.

ADVANTAGEOUS EFFECTS

The present invention has the following significant advantages over the prior art:

1. The present invention uses an LFT-G process to prepare a glass fiber reinforced PP material and a nano-scale nucleating agent to increase the crystallinity of PP, and imparts to the material dually with the advantages of high strength and high heat resistance.

2. PP material has a high transmittance per se, but the addition of glass fiber will cause more reflection and scattering of laser beams in the material, and the addition of high temperature resistant common black colorant will also absorb part of the laser beam, so the laser transmittance is greatly reduced. The PP material of the present invention can form small-sized spherulites under the action of the attapulgite-induced crystallization, thereby reducing the scattering of the laser beam when passing through the material, increasing the transmission rate of the laser beam, and thus increasing the strength of laser welding.

3. In contrast to conventional black colorants, the black colorant of the present invention is a black colorant compounded by solvent Red, solvent Blue, solvent Green, and solvent Yellow in a weight ratio of (6-8):(3-5):(1-3):(0.5-1), which can significantly transmit near-infrared light therethrough.

4. In the present invention, the attapulgite can refine the size of PP spherulites, improve the penetrability of millimeter waves, and reduce the dielectric constant of the material, with the dielectric constant of being about 2.6 under the 77 GHz test condition, and can be used for 77 GHz millimeter wave radar housing.

5. The material of the present invention can be directly injection-molded, for housing structures requiring low dielectric constant, such as radar housings, with the simple preparation process. The black millimeter-wave radar housing material is firmly fixed on the mounting surface by laser welding, which solves the problems of the existing connection methods such as easy detachment and poor sealing performance. It can better protect radar devices.

DESCRIPTION OF THE EXAMPLES

The present invention will be described in further detail with reference to examples.

EXAMPLES

A millimeter-wave radar housing material capable of being laser welded comprising the following components in parts by weight:

| polypropylene | 50-90 |
| glass fiber | 10-50 |
| nucleating agent | 0.2-0.8 |
| compatibilizer | 0.5-1 |
| organic black colorant | 0.1-0.5 |
| antioxidant | 0.1-0.5 |
| light stabilizer | 0.1-0.8 |

The polypropylene is one or more of high flow homo-polypropylene or co-polypropylene.

The glass fiber is one or more of an alkali-free glass fiber yarn treated with a silane-type impregnating agent.

The nucleating agent is a nano-size acicular attapulgite having an aspect ratio of 30-50 and a particle size distribution of 5-8 microns.

The compatibilizer is a graft polymer of maleic anhydride and polyolefin, and the graft ratio of maleic anhydride is 1.0%-2.5%.

The black colorant is compounded by solvent red, E2G, solvent blue, RR, solvent green, 5B, and solvent yellow, Yellow G in a weight ratio of 8:5:3:1. Solvent Yellow, Yellow G is selected from LANXESS solvent colorant MACROLEX® Yellow G.

The antioxidant is one or more of antioxidants such as hindered phenols, amines, phosphite esters, and thioester etc. Preferably, the antioxidant is compounded by 1010 and 168 in a weight ratio of 1:1 or 1:2.

The light stabilizer is one or more of light stabilizers such as hindered amines, benzotriazoles, and benzophenones etc.

The formulations of Examples 1-4 are shown in Table 1. The preparation of the examples comprises the following steps:

adding polypropylene, a compatibilizer, an antioxidant, a black colorant, a nucleating agent and a light stabilizer into a mixer in a certain proportion, thoroughly and homogeneously mixing the same; adding the premix into a twin-screw extruder;

extruding the resulting resin melt into an impregnation die connected to a head of the twin-screw extruder; then passing the continuous glass fiber through the impregnation die, sufficiently impregnating the continuous glass fiber with the melt; finally cooling, drawing and pelletizing the resultant material to obtain a millimeter-wave radar housing pellet material capable of being laser welded.

The pellet material was dried at 90° C. for 3 hours and subjected to injection molding, wherein the operating conditions of the injection molding machine can be as follows: the temperature of the first zone was 200-220° C.; the temperature of the second zone was 230-240° C.; the temperature of the third zone was 240-250° C.; the temperature of the fourth zone was 245-255° C.; the pressure was 60-90 MPa; the speed was 30-50 mm/s. Among them, a set of standard sample bars were tested for mechanical properties, and 60*20*2 bars were laser welded in an overlapping manner.

Test criteria and conditions for the examples: tensile strength was measured according to ISO 527 with a tensile speed of 50 mm/min; the flexural strength was tested according to ISO 178 at a test speed of 2 mm/min; the notched izod impact strength was tested according to ISO 180, V-shaped notch; un-notched Charpy impact strength was tested according to IS0179; the heat distortion temperature was tested according to IS075-2, load: 1.8 MPa; the dielectric property was tested according to SJ 20512-1995, frequency: 77 GHz; laser transmittance: ultraviolet-visible near-infrared spectrophotometer Lambda 950, 60 mm*60 mm*2 mm smooth surface plate, wavelength: 800-1200 nm.

6

TABLE 1

Formulations of Examples 1-4 and Comparative examples

| Formulation | Example 1 | Example 2 | Example 3 | Example 4 | Comparative example 1 |
|---|---|---|---|---|---|
| Homo-PP | 60 | 50 | 60 | 70 | |
| Co-PP | 20 | 20 | | | 70 |
| Continuous glass fiber | 20 | 30 | 40 | 30 | |
| Short glass fiber | | | | | 30 |
| Attapulgite | 0.7 | 0.5 | 0.2 | 0.6 | 0 |
| PP-g-MAH | 0.5 | 0.5 | 0.8 | 1 | 1 |
| Black colorant | 0.2 | 0.5 | 0.4 | 0.3 | |
| Carbon black colorant | | | | | 0.5 |
| Antioxidant 1010 | 0.1 | 0.1 | 0.2 | 0.2 | 0.2 |
| Antioxidant 168 | 0.1 | 0.2 | 0.2 | 0.3 | 0.2 |
| Stabilizer 770 | 0.3 | 0.2 | 0.2 | | 0.3 |
| Stabilizer 944 | 0.2 | 0.4 | 0.2 | | |
| UV-531 | | | | 0.5 | |

TABLE 2

Performance Test Results for Examples 1-4 and Comparative examples

| Examples | Example 1 | Example 2 | Example 3 | Example 4 | Comparative example 1 |
|---|---|---|---|---|---|
| Density | 1.05 | 1.12 | 1.22 | 1.12 | 1.12 |
| Tensile Strength/MPa | 72 | 98 | 124 | 110 | 70 |
| Elongation at break | 2.3 | 1.9 | 2.6 | 2 | 3.5 |
| Flexural Modulus/MPa | 4200 | 6000 | 8300 | 6700 | 4000 |
| Flexural Strength/MPa | 120 | 155 | 185 | 160 | 90 |
| Notched izod impact strength/kJ · m-2 | 20 | 25 | 28 | 23 | 10 |
| Un-notched Charpy impact strength/kJ · m-2 | 55 | 63 | 66 | 61 | 45 |
| Heat distortion temperature HDT (1.8 MPa) | 136 | 155 | 162 | 160 | 115 |
| Dielectric constant Dk | 2.46 | 2.6 | 2.71 | 2.59 | 2.62 |
| Transmittance (950 nm) | 53% | 43% | 35% | 46% | 0 |

7

By way of illustration of the examples, the present invention selects general-purpose plastic polypropylene as the substrate, and adds the alkali-free glass fiber yarn, so as to impart the advantages of high strength and high heat resistance to the material by production through the LFT-G process and the induced crystallization of the nucleating agent. The size of PP spherulite can be refined by attapulgite, which is beneficial to the penetrability of millimeter-wave and reduces the dielectric constant of the material, so as to meet the requirements of high strength, high heat resistance and high wave penetration of 5G radar housing. In addition, the refined spherulite size of PP can reduce the scattering effect of the material on the laser beam, and improve the transmittance of the material, without affecting the transmittance of the material under the action of the organic dye. The millimeter-wave radar housing can be connected to the mounting surface by laser welding. The welding strength is high, and it is not easy to be damaged, which solves a series of problems caused by easy loosening and poor sealing of the existing connection methods.

The present invention includes, but is not limited to, the above examples, and it is intended that improvements and modifications made without departing from the scope of the present invention should all fall within the scope of the present invention. In addition, the material of the present invention can be used not only in millimeter wave radar housings, but also in fields of various radomes requiring low dielectric constant.

What is claimed is:

1. A millimeter-wave radar housing material capable of being laser welded, comprising the following components in parts by weight:

| | |
|---|---|
| polypropylene | 50-90 |
| glass fiber | 10-50 |
| nucleating agent | 0.2-0.8 |
| compatibilizer | 0.5-1 |
| organic black colorant | 0.1-0.5 |
| antioxidant | 0.1-0.5 |
| light stabilizer | 0.1-0.8. | wherein the nucleating agent is a nano-scale acicular attapulgite; and wherein the organic black colorant is compounded by solvent red, solvent blue, solvent green, and solvent yellow in a weight ratio of (6-8):(3-5):(1-3):(0.5-1).

8

2. The millimeter-wave radar housing material capable of being laser welded of claim 1, characterized in that, the polypropylene is one or more of a high flow homo-polypropylene or a co-polypropylene.

3. The millimeter-wave radar housing material capable of being laser welded of claim 1, characterized in that, the glass fiber is one or more of an alkali-free glass fiber yarn treated with a silane-type impregnating agent.

4. The millimeter-wave radar housing material capable of being laser welded of claim 1, characterized in that, the nano-scale acicular attapulgite has an aspect ratio of 30-50 and an average particle size of 5-8 micrometers.

5. The millimeter-wave radar housing material capable of being laser welded of claim 1, characterized in that, the compatibilizer is a graft polymer of maleic anhydride and polyolefin, and the maleic anhydride graft ratio is 1.0%-2.5%.

6. The millimeter-wave radar housing material capable of being laser welded of claim 1, characterized in that, the solvent red is E2G; the solvent blue is RR; the solvent green is 5B; the solvent yellow is Yellow G.

7. The millimeter-wave radar housing material capable of being laser welded of claim 1, characterized in that, the antioxidant is one or more of hindered phenols, phosphite esters and thioester.

8. The millimeter-wave radar housing material capable of being laser welded of claim 1, characterized in that, the light stabilizer is one or more hindered amines, benzotriazoles, and benzophenones.

9. The preparation method for a millimeter-wave radar housing material capable of being laser welded of claim 1, comprising the steps of:

adding polypropylene, a compatibilizer, an antioxidant, an organic black colorant, a nucleating agent and a light stabilizer into a mixer in parts by weight, thoroughly and homogeneously mixing the same to obtain a premix; adding the premix into a twin-screw extruder; extruding the resulting resin melt into an impregnation die connected to a head of the twin-screw extruder; then passing the continuous glass fiber through the impregnation die, sufficiently impregnating the continuous glass fiber with the melt; finally cooling, drawing and pelletizing the resultant material to obtain a millimeter-wave radar housing material capable of being laser welded, wherein the nucleating agent is a nano-scale acicular attapulgite.

* * * * *